April 15, 1969          G. LE ROY          3,438,539

SIGHT GLASS FOR REACTION VESSELS

Filed Oct. 22, 1965

INVENTOR

GENE LE ROY

BY Cushman, Darby & Cushman
ATTORNEYS 3,438,539
SIGHT GLASS FOR REACTION VESSELS
Gene Le Roy, Rte. 1, Box 510, Maplewood Estates,
Scott Depot, W. Va. 25560
Filed Oct. 22, 1965, Ser. No. 502,662
Int. Cl. B65d 53/06
U.S. Cl. 220—46      3 Claims

ABSTRACT OF THE DISCLOSURE

An improved sight glass of the type used to inspect contents of a chemical vessel or the like including a lens secured to the vessel adjacent to the opening therein. The lens is a laminate of two or more lens elements cemented together. A vapor impermeable thin metal tube surrounds the lens elements to prevent the contents of the vessel from attacking the cement between the lens elements.

---

Figure 1:
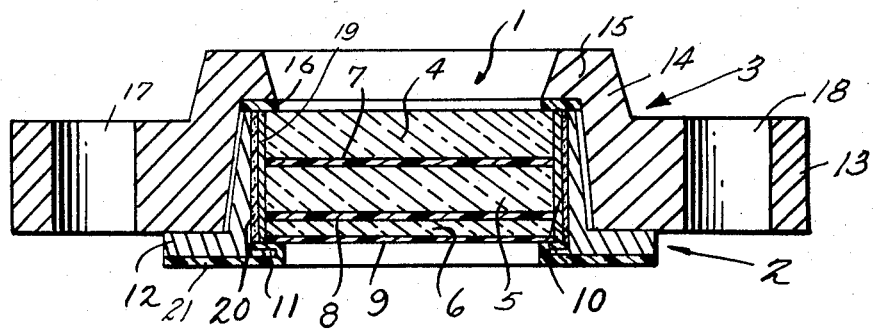

The present invention relates to a sight glass for use with enclosed vessels and the like. More particularly, it is an improvement on sight glasses having laminated lenses comprised of several layers of glass cemented together.

A sight glass is a device secured over an opening in a vessel to permit inspection of the contents. Similar devices also are used as windows for ships which are submerged in water. Generally the glass comprises a lens and associated parts which hold it against the rim around the opening.

The lens frequently is a laminate comprising one or more layers of tempered glass, selected for high strength, and a layer of untempered glass such as borosilicate which is resistant to attack by corrosive elements. Two layers of tempered glass are preferred because tempered glass, which is under stress, has a tendency to rupture. That is, the chances of damage from rupturing of a tempered glass lens are reduced by using two layers because it is highly unlikely that both lenses will rupture at the same time. The several layers of glass are cemented together with a clear adhesive.

Certain problems have existed in the selection of a suitable adhesive because of the leakage of a small amount of the materials within the vessel. That is, materials in the vessel may diffuse through packing materials and other materials used to seal the opening around the lens. If the adhesive is subject to attack by the materials in the vessel, the cement may become cloudy and the strength of the bond between the layers of glass may be reduced. Diffusion of these materials is difficult to avoid, and actually, when packing is used, it is not completely desirable to prevent it. That is, they may swell the packing and therefore make it more effective in preventing leakage to the atmosphere. In addition, the compression of the packing must be carefully controlled as described in my U.S. Patent 3,307,400.

To avoid this, various cements which are resistant to chemical attack have been tried. For example, epoxy resins are now available which are quite resistant to chemical attack. However, those resins which are most resistant are not satisfactory, for example because of lack of optical clarity or insufficient bonding capacity. Therefore a compromise must be made between maximum resistance to chemical attack, optical clarity and adhesion.

A principal object of the present invention is to provide a different means for preventing deterioration of the cement. Briefly stated, this object is achieved by a gas impermeable barrier around and cemented to the lens assembly.

Figure 2:
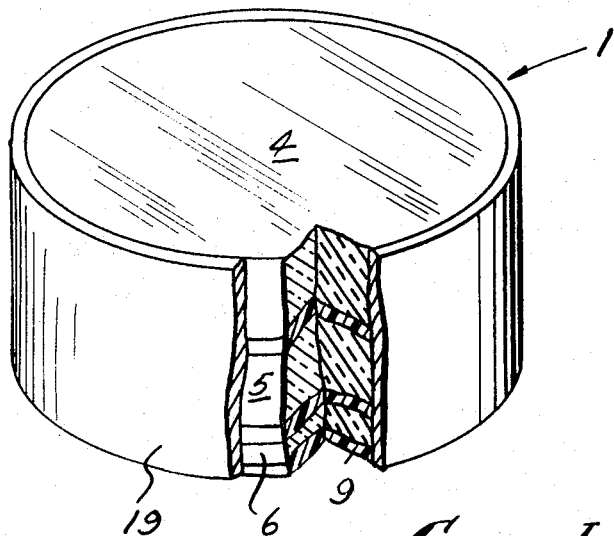

This invention now will be illustrated by a detailed description of a preferred embodiment, reference being made to the drawing, in which:

FIGURE 1 is a cross-section taken through the center of a sight glass embodying the present improvement; and FIGURE 2 is a perspective, partially in section, of the lens assembly of the sight glass of FIGURE 1.

As shown in FIGURE 1, the sight glass comprises three principal elements: a cylindrical lens assembly 1, and means for holding the lens assembly against a vessel including a ferrule 2 and a compression ring 3. The lens assembly includes a lens comprising a laminate of three glass elements, including two layers of tempered glass 4 and 5 and a layer of chemically resistant glass such as borosilicate glass 6. This is selected for corrosion resistance. The layers are held together by cement layers 7 and 8 which for purposes of illustration will be described as epoxy resins.

In the form of the invention illustrated, the innermost layer of glass 6 is covered with a layer of resistant plastic 9. This may be a plastic film bonded to the borosilicate glass such as Kel-F, a high molecular weight polymer of chlorotrifluoroethylene or fluorinated ethylene-propylene resin. These polymers also may be obtained in the form of aqueous dispersions which may be sprayed on and baked.

The ferrule 2, in the form shown, is a frustrum having a cylindrical bore 10 to receive the lens assembly, and internal and external flanges 11 and 12 at its inner end. The internal flange 11 provides a ledge against which the lens assembly rests and the external flange is a stop for the compression ring 3.

As shown in FIGURE 1, the compression ring has a circular plate 13 which rests on the external flange 12, a frustoconical portion 14 which surrounds the ferrule, and an upper annular section 15 etxending inwardly from the portion 14 and overlying the lens assembly 1. There is a space between the section 15 and the top of the ferrule which receives a gasket 16. That is, the distance from the bottom of this annular section to the bottom of the compression ring is greater than the distance from the top of the ferrule to the top of the external flange 12. Consequently, when the compression ring is tightened down against flange 12, there is a controlled distance between the top of the ferrule and annular section 15, and regulated pressure is applied to the gasket 16. Bolt holes 17 and 18 are provided in plate 13 for fastening the compression ring 3 to the vessel and tightening it against flange 12.

In accordance with the present invention, the lens assembly includes a tight-fitting tube 19 which encircles the peripheral edges of lens elements 4, 5 and 6, cement layers 7 and 8, and coating layer 9. This tube is composed of a material whic his substantially more vapor-impermeable than the packing 20 which surrounds it. Preferably, the tube is a relatively corrosion resistant metal. For example, it may be stainless steel or copper. However, non-metallic materials may be used such as saran (copolymers of vinylidene chloride) which is known to have a very low gas transfer rate.

The tube 19 preferably should be sealed to the glass elements by a cement which also is relatively impermeable to gas or otherwise should form a gas tight seal against the glass. When the tube is a synthetic plastic, it may be possible to form it against the glass without adhesive. For example, the lens may be placed in a mold and molten plastic poured around it. In some cases, the plastic tube may be produced by polymerizing a monomer around the lens elements.

The tube may be rather thin. For example, a metal tube may have a thickness of only .003–.005 inch for the sight glass shown in the drawings. However, the thickness can be increased for example to 0.125 inch, and the tube will then perform the further function of strengthening the lens and protecting it against breakage. Thin, flexible tubes have certain advantages in view of differential expansion problems described in the aforesaid application Ser. No. 392,387.

In practice, the lens assembly is mounted in the tube 19 and secured in the ferrule surrounded by a relatively gas permeable packing or potting material 20 such as graphite-asbestos, or the packings of the aforesaid U.S. Patent 3,307,400. These are in a space through which the contents of the vessel might flow into contact with the cement between lens elements, if it were not for the presence of tube 19. This provides a composite replacement unit purchased by a customer containing a lens mounted in the ferrule. The unit also includes an annular gasket 21 having a J-shaped cross section, for example Teflon, between the lens assembly and flange 11 of the ferrule, which may be of the form shown, as further described in my copending application Ser. No. 502,661 filed Oct. 22, 1965. The unit is used by placing it against a vessel, positioning the pressure ring 3 over it and tightening bolts.

It will be appreciated that the lens-tube assembly illustrated in FIGURE 2 can also be used in other types of sight glasses, especially when it is surrounded by a relatively vapor permeable packing. Therefore, various changes may be made in details of construction and mode of operation without departing from the scope of the invention.

What is claimed is:
1. In a sight glass for cooperation with an opening in a vessel which comprises a lens having a plurality of elements cemented together by a cement, means for holding said lens over said opening to permit inspection through said opening, said holding means defining between itself and said lens a space around said lens elements through which the contents of said vessel may flow into contact with cement between said lens elements and having a packing in said space;

the improvement which comprises a tight-fitting tube around said lens and about 0.001–0.125 inch thick of a material which is substantially more impermeable to vapors than said packing and which separates said lens from said packing.

2. A sight glass as set forth in claim 1 in which said tube is cemented to said elements.

3. A sight glass as set forth in claim 1 in which said tube is metal.

References Cited

UNITED STATES PATENTS

| 1,703,426 | 2/1929 | Kerr | 73—330 |
| 2,773,387 | 12/1956 | Miller | 73—330 |
| 3,103,083 | 9/1963 | Seeger. | |
| 3,307,400 | 3/1967 | Le Roy | 73—331 |
| 2,423,491 | 7/1947 | Fairbank | 350—252 |
| 2,491,758 | 12/1949 | Nichols et al. | 350—252 |
| 2,942,469 | 6/1960 | Le Roy | 73—334 |
| 3,148,543 | 9/1964 | Le Roy | 73—331 |

FOREIGN PATENTS

| 555,008 | 7/1932 | Germany. |
| 874,884 | 8/1961 | Great Britain. |

LOUIS R. PRINCE, *Primary Examiner.*

DANIEL M. YASICH, *Assistant Examiner.*

U.S. Cl. X.R.

220—82